United States Patent [19]

Lanham et al.

[11] 4,411,552

[45] Oct. 25, 1983

[54] JOINT FOR SECURING A TUBULAR MEMBER TO A SUPPORT MEMBER

[75] Inventors: Joseph S. Lanham, Lexington; Neal R. Bruckner, Georgetown, both of Ky.

[73] Assignee: Hoover Universal, Inc., Ann Arbor, Mich.

[21] Appl. No.: 268,272

[22] Filed: May 29, 1981

[51] Int. Cl.³ .............................................. F16B 25/00
[52] U.S. Cl. .................................... 403/388; 403/408
[58] Field of Search .................... 403/388, 408, 393

[56] References Cited

U.S. PATENT DOCUMENTS

| | | | |
|---|---|---|---|
| 2,643,706 | 6/1953 | Brown | 403/388 |
| 2,687,283 | 8/1954 | Enghauser | 256/21 |
| 2,851,236 | 9/1958 | Koller et al. | 403/393 X |
| 3,362,737 | 1/1968 | Cobb | 403/408 X |
| 3,910,004 | 10/1975 | Bebinger | 403/388 X |
| 3,932,050 | 1/1976 | Yahraus | 403/408 X |

Primary Examiner—Andrew V. Kundrat
Attorney, Agent, or Firm—Stephenson and Boller

[57] ABSTRACT

A joint for securing a tubular member to a support member comprises a pair of extruded holes in the sidewall of the tubular member opposite each other, a hole in the support member, the tubular member being disposed against the support member with the extruded holes in alignment with the hole in the support member, and a self-tapping fastener engaging the support member and passing through the hole therein to threadedly engage both extruded holes, the threaded fastener having cut complementary threads in both extruded holes during fastening.

10 Claims, 2 Drawing Figures

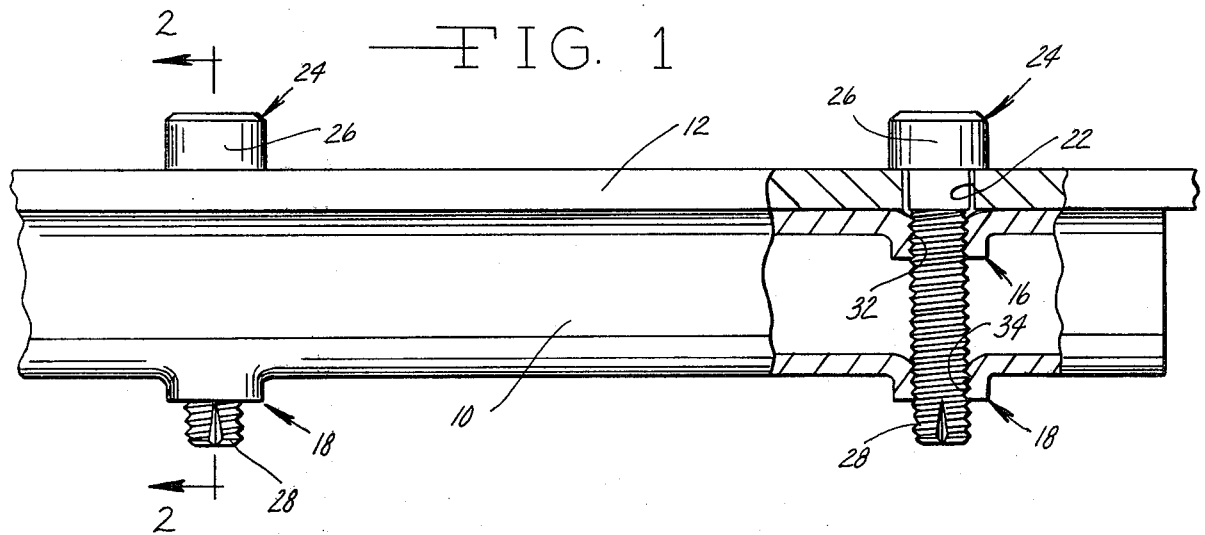
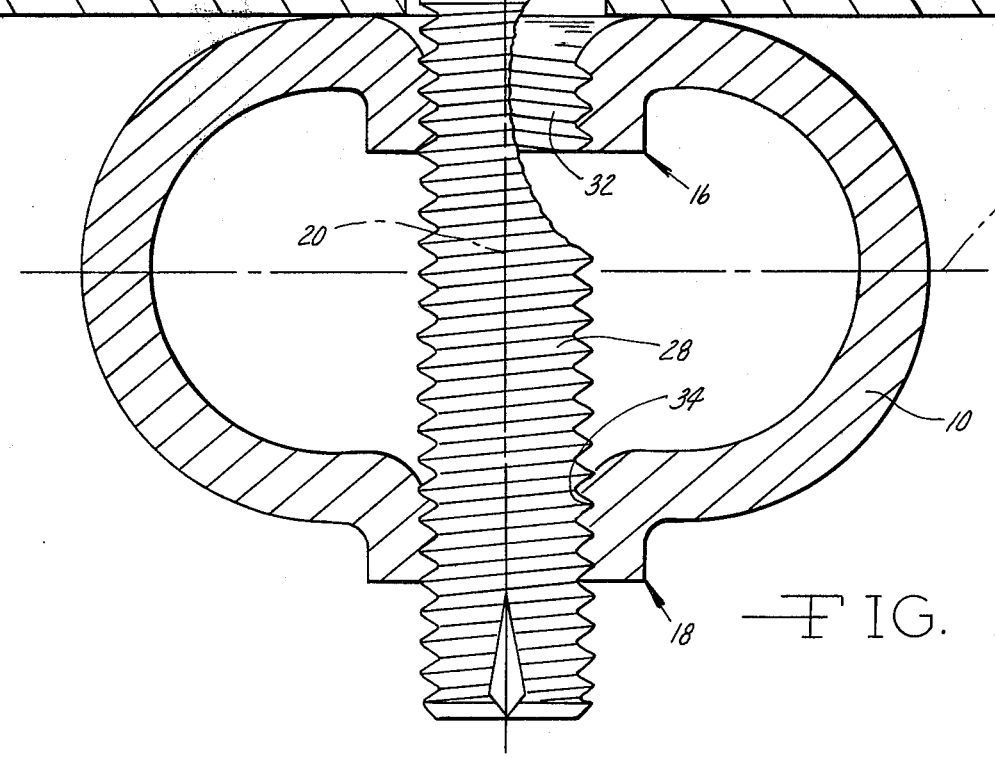

JOINT FOR SECURING A TUBULAR MEMBER TO A SUPPORT MEMBER

BACKGROUND AND SUMMARY OF THE INVENTION

The present invention relates to a joint and is specifically concerned with a joint for securing a tubular member to a support member.

Certain structural configurations may require that a tubular member be secured to a support member. By way of an example, the tubular member could be an extruded metal element while the support member could be a formed metal bracket or plate. A specific application for this type of a joint involves the construction of a seat wherein a tubular metal frame for the seat back is formed into a generally inverted U shape configuration. Spaced apart metal brackets, or plates, are provided at the base of the seat back and it is necessary for the ends of the inverted U-shaped tube to be secured to these metal brackets.

A previous construction for this joint involved mounting weld nuts in the sidewall of the tube adjacent the tube ends. A clearance hole is provided in the tube wall opposite each weld nut. The tube is assembled to the brackets by placing each clearance hole in the tube in alignment with a corresponding hole in the attaching bracket and then running a screw through the bracket hole, through the clearance hole in the tube sidewall, across the inside of the tube and into the weld nut in the far portion of the tube sidewall. As the fastener is torqued, the tube is drawn against the mounting bracket.

The previous procedure described in the preceding paragraph is disadvantageous from the standpoint that separate elements, i.e. the weld nuts, must be assembled to the tube. The tube must also be processed beforehand to provide the necessary clearance holes as well as to provide for the mounting the weld nuts to the tube.

The present invention is directed to a new and improved joint for securing a tubular member to a support member. The invention is particularly advantageous in the context of mounting a tubular seat back to attaching brackets, although it will be appreciated that principles of the invention are applicable to other specific embodiments. One significant advantage of the invention is that it eliminates the requirement for mounting weld nuts on the tubular member. This yields economy in the fabrication of the tubular element. A further benefit of the invention is that an improved, more secure joint construction is obtained with the present invention. Hence with the invention a more economical yet sturdier joint results.

Briefly the invention, in its preferred embodiment, comprises a pair of aligned extruded holes in the sidewall of the tubular member opposite each other, a clearance hole in the support member aligned with the extruded holes of the tubular member, and a self-tapping screw engaging the support member and passing through the hole in the support member with the shank of the self-tapping screw threadedly engaging complementary threads in both of the extruded holes which were cut by the self-tapping screw during the process of fastening of the two members together by means of the screw. As a consequence the holding force between the two members is concentrated between the abutting portions of the support member and the tubular member. This is in contrast to the prior weld nut construction wherein the holding force is applied at the far opposite sidewall portion of the tube containing the weld nut. Consequently, the invention provides a studier joint with increased holding force.

In connection with the present invention a novelty search was conducted in the United States Patent and Trademark Office and the following patents were developed: Nos. 1,962,035; 1,926,686; 1,951,839; 2,062,685; 2,234,097; 3,362,737; 3,869,219; 3,414,304.

The foregoing features, advantages and benefits of the invention, along with additional ones, will be seen in the ensuing description and claims which should be considered in conjunction with the accompanying drawing. The drawing discloses a preferred embodiment of the invention according to the best mode contemplated at the present time for carrying out the invention.

BRIEF DESCRIPTION OF THE DRAWING

FIG. 1 is a longitudinal view with portions broken away of an exemplary form of joint embodying principles of the invention.

FIG. 2 is an enlarged sectional view, having a portion broken away, taken in the direction of arrows 2-2 in FIG. 1.

DESCRIPTION OF THE PREFERRED EMBODIMENT

In the drawing a tubular member 10 is disposed against a support member 12. The tubular member is of generally elliptical cross sectional shape and is disposed against the support member in such a way that the major axis 14 of the ellipse is parallel to the flat surface of the support member against which the tubular member is disposed. The members may be metal such as steel or aluminum, for example.

The tubular member comprises a pair of aligned extruded holds 16 and 18 respectively in opposite sides of the tubular sidewall on opposite sides of the major axis 14. The holes are aligned with the minor axis 20 of the elliptical cross-section which is perpendicular to the longitudinal axis of the tube.

The extruded holes may be formed in the sidewall by piercing the tube with a punch which first passes through the sidewall to form the extruded hole 16 and continues on through to form the further extruded hole 18. During the piercing operation there may be a certain tendency for the tube wall to collapse slightly, at least locally around each extruded hole. The collapse is controlled, if it becomes objectionable, by confining the tube circumferentially around the vicinity of the points of extrusion.

A clearance hole 22 of a slightly larger diameter than that of either extruded hole is provided in support member 12. The tube is placed against support member 12 with the hole 22 aligning with the extruded holes 16 and 18. A self-tapping fastener in the form of a self-tapping screw 24 fastens the two members together. The illustrated screw comprises a head 26 and a shank 28. The head includes a polygonal socket 30 which is engaged by a corresponding drive tool (not shown) to actuate the fastener for fastening the two members together.

Each extruded hole is formed by displacing the tube sidewall material generally to the illustrated configuration. As a consequence the extruded hole has a length, measured radially of the tube, which may exceed the nominal thickness of the tube sidewall. Desirably both aligned extruded holes 16, 18 should have the same diameters after being extruded and should be circular. Because of forming considerations during the extrusion process, each extruded hole merges into the tube sidewall by a curved 90° bend. Hence, in the case of hole 16, the desired circular diameter of the extruded hole does not begin immediately at the outer surface of the tubular sidewall. Rather, it begins where the curved 90° bend straightens out. In the case of hole 16, this can be an advantage in that the curved bend may function as a lead facilitating starting of the screw shank in the hole during fastening. The increased length of hole 16 over the nominal tube wall thickness can be advantageous in ensuring that the screw runs straight through, rather than cocked, so that it will readily pick up the opposite hole 18. The material of the tube is also softer than that of the threaded fastener so that the threaded fastener will function to cut threads in the extruded holes 16 and 18 when the two members are secured together by means of the fastener.

Fastening is accomplished by passing the distal end of the shank of the screw through the clearance hole 22 in the support plate. The screw is rotated about its axis and advanced axially to cut a thread 32 in the extruded hole 16. Continued rotational advance of the screw will cause the shank to engage the far extruded hole 18 cutting a thread 34 in its inner wall surface. When the head of the screw abuts the support member and with the tube against the support member, an increased torque is encountered as the tube and the support are urged forceably together. The screw is torqued to a desired magnitude. The holding force is concentrated where the sidewall of the tube is disposed directly against support member 12. The two separate threaded holes 16 and 18 may be considered as somewhat like a double nut arrangement. In response to the increasing torque and corresponding increase in holding force as the joint is secured, there occurs slight movement of the far sidewall of the tube around extruded hole 18 toward the near sidewall containing hole 16 which is abutting the support member. This results in a differential thread action of the two threaded extruded holes relative to the screw, making the fastening more secure and contributing the improved holding quality of the joint.

This mode of operation is to be distinguished from that of the prior technique of using a weld nut. In that prior technique, the weld nut would be located at the place where extruded hole 18 is located, and instead of extruded hole 16 there would be a clearance hole. A fastener would be run through hole 22 and the clearance hole corresponding to hole 16 and into the weld nut corresponding to extruded hole 18. The holding force in that instance would be concentrated at the location where the screw engages the weld nut, i.e. at the far side of the tube sidewall relative to support 12. Such a joint does not possess the holding force which is obtainable with the joint of the present invention and furthermore the prior joint is more costly to fabricate.

FIG. 1 illustrates a joint which has two fastening points spaced lengthwise of the tubular member. The structure at each fastening point is identical, each fastening point comprising extruded holes 16 and 18 in the tubular member with a corresponding clearance hole 22 in the support member and a fastener 24. This two point fastening construction could be utilized in securing one end of a U shaped tubular frame to a support bracket, as in the application of mounting a seat back frame to a support, referred to earlier. Thus if the view of FIG. 1 were rotated 90° in the clockwise sense, the lower end of the tubular member would be one end of the inverted U-shaped seat back frame and the support member 12 could be a mounting bracket or plate on the base of the seat and having a flat upright portion of uniform thickness to which the tubular frame is secured. There would be a corresponding arrangement for the opposite end of the frame.

For a given joint embodying principles of the invention, various conventional design factors will typically be taken into account. These include tube diameter and wall thickness, type and size of self-tapping thread, tube material and forming characteristics. It should be recognized that the larger the diameter of screw shank in relation to a given tube, the more material may be displaced by extrusion to form the extruded holes. Correspondingly, if the length of each extruded hole can be increased, it may be possible to use a coarser thread for the self-tapping screw. While the example referred to earlier indicated that the length of each extruded hole could exceed the wall thickness of the tube, it is not essential that such be the case in all instances. Thus, it should be understood that these various factors exhibit a certain degree of interaction. In order to achieve an optimum joint for a given application, it may be desirable to evaluate the effects of these various factors experimentally before a production design for the joint is finalized.

While a preferred embodiment of the invention has been disclosed, it will be appreciated that other embodiments are contemplated within the scope of the following claims.

What is claimed is:

1. A joint for securing a tubular member to a support member comprising a pair of aligned extruded holes in the sidewall of the tubular member opposite each other, a hole in the support member, the support member being disposed against the outside surface of the portion of the sidewall of the tubular member containing one of said pair of extruded holes and with the pair of extruded holes of the tubular member being aligned with the hole in the support member, and fastening means fastening the two members together comprising means engaging the support member and passing through the hole in the support member including a shank having a self-tapping thread which threadedly engages complementary threads in both extruded holes in the tubular member, said self-tapping thread having cut the complementary threads in both extruded holes during the fastening operation, the portion of the tubular member's sidewall containing the other of said extruded holes being slightly displaced toward the portion containing said one extruded hole during the fastening operation to create differential thread action of the two threaded extruded holes on the shank of said fastening means and improve the holding quality of the joint.

2. A joint as set forth in claim 1 wherein said fastening means includes a head engaging the support member on the side of the hole in the support member opposite the tubular member.

3. A joint as set forth in claim 1 wherein the hole in the support member has a diameter larger than that of the complementary threaded portion of either extruded hole.

4. A joint as set forth in claim 1 wherein said other extruded hole is extruded radially outwardly of the tubular member.

5. A joint as set forth in claim 1 wherein the support member is flat and of uniform thickness in the immediate region around the hole therein, said tubular member being disposed directly against this region of the support member.

6. A joint as set forth in claim 1 wherein the pair of aligned extruded holes are on an axis centrally located relative to the tubular member.

7. A joint for securing a tubular member to a support member comprising a pair of aligned extruded holes in the sidewall of the tubular member opposite each other, a hole in the support member, the outside surface of the sidewall of the tubular member being disposed against the support member with the pair of extruded holes of the tubular member being aligned with the hole in the support member, and fastening means fastening the two members together comprising means engaging the support member and passing through the hole in the support member including a shank having a self-tapping thread which threadedly engages complementary threads in both extruded holes in the tubular member, said self-tapping thread having cut the complementary threads in both extruded holes during the fastening operation, and wherein the tubular member has an elliptical cross sectional shape with the major diameter of the ellipse and the axis of the fastening means being disposed at a right angle to each other.

8. A joint for securing a tubular member to a support member comprising a pair of aligned extruded holes in the sidewall of the tubular member opposite each other, a hole in the support member, the outside surface of the sidewall of the tubular member being disposed against the support member with the pair of extruded holes of the tubular member being aligned with the hole in the support member, and fastening means fastening the two members together comprising means engaging the support member and passing through the hole in the support member including a shank having a self-tapping thread which threadedly engages complementary threads in both extruded holes in the tubular member, said self-tapping thread having cut the complementary threads in both extruded holes during the fastening operation, wherein the support member is flat and of uniform thickness in the immediate region around the hole therein, said tubular member being disposed directly against this region of the support member, and including a further pair of aligned extruded holes in the tubular member, said further pair of extruded holes being spaced lengthwise of the tubular member from the first pair of extruded holes, a further hole in the support member bounded by a flat region of uniform thickness and aligned with the further pair of extruded holes in the tubular member, the tubular member being disposed directly against this further region of the support member, a further fastening means fastening the two members together comprising means engaging the support member and passing through a further hole in the support member and including a shank having a self-tapping thread thereon which threadedly engages complementary threads in both of the further extruded holes, the self-tapping thread of said further fastening means having cut the complementary threads in both of said further pair of extruded holes during the fastening operation.

9. A joint for securing a tubular member to a support member comprising a pair of aligned extruded holes in the sidewall of the tubular member opposite each other, said pair of extruded holes being extruded in the same direction such that one extends radially inwardly of the tubular member and the other radially outwardly of the tubular member, a hole in the support member, the outside surface of the sidewall of the tubular member being disposed against the support member with the pair of extruded holes of the tubular member being aligned with the hole in the support member, and fastening means fastening the two members together comprising means engaging the support member and passing through the hole in the support member including a shank having a self-tapping thread which threadedly engages complementary threads in both extruded holes in the tubular member, said self-tapping thread having cut the complementary threads in both extruded holes during the fastening operation.

10. In combination, a tubular member and a support member secured together by fastening means having a head portion and a threaded shank portion, said support member being disposed against the outside surface of the sidewall of the tubular member at that portion of the tubular member's sidewall which contains an integral radially extruded hole, said tubular member also being provided with a second integral radially extruded hole aligned with the first-mentioned integral radially extruded hole and disposed in the tubular member's sidewall opposite the location of the first-mentioned integral radially extruded hole, said support member comprising a hole in alignment with said two extruded holes, said fastening means having an operative engagement with said support member and said tubular member such that the head portion of the fastening means is disposed against said support member and the threaded shank portion of the fastening means threadedly engages said two extruded holes, said fastening means having an interaction with said first extruded hole during the fastening operation such that the two members are first forcefully drawn together and subsequently with the second extruded hole such that the portion of the tubular member's sidewall containing the second extruded hole is displaced slightly toward the portion containing the first-mentioned extruded hole as the fastening operation is being completed to create a differential thread action by the two extruded holes on the shank portion of the fastening means and thereby improve the holding quality of the joint.

* * * * *